United States Patent
Kocsor et al.

(10) Patent No.: US 8,781,880 B2
(45) Date of Patent: Jul. 15, 2014

(54) SYSTEM, METHOD AND APPARATUS FOR VOICE ANALYTICS OF RECORDED AUDIO

(71) Applicant: Rank Miner, Inc., St. Petersburg, FL (US)

(72) Inventors: Andras Kocsor, Szeged (HU); Kornel Kovacs, Szeged (HU); Attila Bodogh, Szentendre (HU); Istvan Feher, Budapest (HU)

(73) Assignee: Rank Miner, Inc., St. Petersburg, FL (US)

( * ) Notice: Subject to any disclaimer, the term of this patent is extended or adjusted under 35 U.S.C. 154(b) by 0 days.

(21) Appl. No.: 13/909,351

(22) Filed: Jun. 4, 2013

(65) Prior Publication Data
US 2013/0325560 A1 Dec. 5, 2013

Related U.S. Application Data (60) Provisional application No. 61/655,594, filed on Jun. 5, 2012.

(51) Int. Cl.
*G06Q 10/00* (2012.01)
*G06Q 10/06* (2012.01)

(52) U.S. Cl.
CPC .................. *G06Q 10/06375* (2013.01)
USPC ........................................................ 705/7.37

(58) Field of Classification Search
CPC ................... G06Q 10/06; G06F 17/60
USPC ........................................................ 705/7.37
See application file for complete search history.

(56) References Cited

U.S. PATENT DOCUMENTS

| | | |
|---|---|---|
| 6,493,668 B1 | 12/2002 | Brandman |
| 6,600,821 B1 | 7/2003 | Chan et al. |
| 6,665,644 B1 | 12/2003 | Kanevsky et al. |
| 7,010,115 B2 * | 3/2006 | Dezonno et al. ......... 379/265.09 |
| 7,191,133 B1 | 3/2007 | Pettay |
| 7,412,377 B2 | 8/2008 | Monkowski |
| RE40,634 E | 2/2009 | Blair et al. |
| 7,546,173 B2 | 6/2009 | Waserblat et al. |
| 7,577,246 B2 | 8/2009 | Idan et al. |
| 7,627,475 B2 | 12/2009 | Petrushin |
| 7,725,340 B2 | 5/2010 | Reisz et al. |
| 7,751,590 B2 | 7/2010 | Sharoni et al. |

(Continued)

OTHER PUBLICATIONS

Barnard, Patrick, Top Five Advantages of E-Learning for the Contact Center [online], Entrepreneur.com, Aug. 2007 [retrieved on Nov. 4, 2008]. Retrieved from the Internet: <http://www.entrepreneur.com/tradejournals/article/print/168742948.html>.

(Continued)

*Primary Examiner* — Beth V Boswell
*Assistant Examiner* — Hafiz Kassim
(74) *Attorney, Agent, or Firm* — Daly, Crowley, Mofford & Durkee, LLP (57) ABSTRACT

Disclosed is a method for analyzing recorded telephone calls in order to predict business outcomes. The method involves recording a series of initial telephone calls and analyzing those calls for particular audio features. The audio features are tabulated and annotated to specify whether the telephone call resulted in a pre-determined business outcome. A model is then built whereby the pre-determined business outcome can be predicted based upon the presence of certain audio features. The model can subsequently be used to predict whether future calls are likely to result in the pre-determined business outcome.

17 Claims, 4 Drawing Sheets

(56) References Cited

U.S. PATENT DOCUMENTS

| | | | |
|---|---|---|---|
| 7,752,043 B2 | 7/2010 | Watson | |
| 7,788,095 B2* | 8/2010 | Wasserblant et al. | 704/251 |
| 7,983,910 B2* | 7/2011 | Subramanian et al. | 704/250 |
| 8,005,676 B2 | 8/2011 | Duke et al. | |
| 8,094,803 B2 | 1/2012 | Danson et al. | |
| 8,126,723 B1 | 2/2012 | Bansal et al. | |
| RE43,255 E | 3/2012 | Blair et al. | |
| 2004/0096050 A1* | 5/2004 | Das et al. | 379/265.12 |
| 2004/0098274 A1* | 5/2004 | Dezonno et al. | 705/1 |
| 2006/0265089 A1 | 11/2006 | Conway et al. | |
| 2007/0083370 A1 | 4/2007 | Scarano et al. | |
| 2008/0189171 A1 | 8/2008 | Wasserblat et al. | |
| 2008/0228296 A1 | 9/2008 | Eilam et al. | |
| 2009/0103708 A1 | 4/2009 | Conway et al. | |
| 2009/0150322 A1 | 6/2009 | Bower et al. | |
| 2009/0292541 A1 | 11/2009 | Daya et al. | |
| 2009/0292583 A1 | 11/2009 | Eilam et al. | |
| 2010/0161335 A1 | 6/2010 | Whynot | |
| 2010/0183138 A1 | 7/2010 | Spottiswoode et al. | |
| 2010/0191689 A1 | 7/2010 | Cortes et al. | |
| 2010/0329437 A1* | 12/2010 | Jeffs et al. | 379/112.06 |
| 2010/0332287 A1* | 12/2010 | Gates et al. | 705/10 |
| 2011/0033036 A1 | 2/2011 | Edwards et al. | |
| 2012/0016674 A1 | 1/2012 | Basson et al. | |
| 2013/0121580 A1* | 5/2013 | Chen et al. | 382/182 |

OTHER PUBLICATIONS

Neustein, Amy, Advances in Speech Recognition: Mobile Environments, Call Centers and Clinics [online], Springer Science+Business Media, LLC, 2010, Retrieved from the Internet: <http://books.google.com/books?id=T1RLwTHerilC&Ipg=PR5&ots=zDqlv3CZxp&dq=%22speech%20analytic%22%20business%20voice%20ranking%20customers&Ir&pg=PR5#v=onepage&q&f=false>.

Polzehl, Tim and Metze, Florian, Using Prosodic Features to Prioritize Voice Messages, Speech Search Workshop at SIGIR, Jul. 2008, Singapore.

ULTRA Intellifind, Advanced Speech Analytics, A Verint Systems Technical Brief, Sep. 2005, pp. 1-17.

* cited by examiner

FIG. 1

| Audio Feature Matrix | | | |
|---|---|---|---|
| Phone Call | Audio Feature No. 1 | Audio Feature No. 2 | Audio Feature No. 3 |
| Caller No. 1 | 0 | 1 | 1 |
| Caller No. 2 | 1 | 0 | 1 |
| Caller No. 3 | 1 | 1 | 1 |
| Caller No. 4 | 0 | 0 | 0 |
| Caller No. 5 | 1 | 1 | 0 |

FIG. 2a

| Annotated Audio Feature Matrix | | | | |
|---|---|---|---|---|
| Phone Call | Audio Feature No. 1 | Audio Feature No. 2 | Audio Feature No. 3 | Desired Business Outcome |
| Caller No. 1 | 0 | 1 | 1 | 0 |
| Caller No. 2 | 1 | 0 | 1 | 1 |
| Caller No. 3 | 1 | 1 | 1 | 1 |
| Caller No. 4 | 0 | 0 | 0 | 1 |
| Caller No. 5 | 1 | 1 | 0 | 0 |

ID APPARATUS FOR
SYSTEM, METHOD AND APPARATUS FOR VOICE ANALYTICS OF RECORDED AUDIO

RELATED APPLICATION DATA

This application claims priority to co-pending provisional application Ser. No. 61/655,594 filed on Jun. 5, 2012 and entitled "System, Method, and Apparatus for Voice Analytics of Recorded Audio." The contents of this co-pending application are fully incorporated herein for all purposes.

BACKGROUND OF THE INVENTION

1. Field of the Invention

This invention relates to a method for analyzing recorded speech. More specifically, the present invention relates to a method for predicting business outcomes by analyzing recorded speech.

2. Description of the Background Art

Presently, there are methods to enable companies to use speech analytics for enhancing a company's business performance. Currently, however, such methods require costly and unnecessary methods.

Call centers usually deal with calls, complaints, and requests coming from a large number of clients. These conversations can support several business processes, such as customer retention, sales, fraud management, etc. For instance, in the case of an inbound sales business process, the agent asks the client whether he or she is interested in a new product or service. The question is whether any alternative product or service should be offered in the form of a direct telephone call to clients who did not purchase anything during the previous telephone conversation (i.e. in the "inbound" sales phase).

Prior solutions utilize computer technology to recognize content (e.g. keywords, full sentences, etc.) in digitally recorded conversations. Other solutions have utilized signal-based information from human voice such as loudness, speed, and changes in intonation, but have done so based upon keyword or full sentence content. Such approaches require sophisticated and expert work to configure and maintain their operability.

The present invention eliminates the need for expensive and burdensome speech analytics and allows companies to use speech analytics to enhance a company's business performance.

The present invention is created for companies in need of speech analytics to enhance a company's business performance.

SUMMARY OF THE INVENTION

Therefore, it is an object of this invention to provide an improvement which overcomes the aforementioned inadequacies of the prior art systems and provides an improvement which is a significant contribution to the advancement of the art of speech analytics.

Another object of this invention is to predict business outcomes based upon audio recordings.

A further object of this invention is to create a model for the given business target, based upon annotated sound conversations.

For the purposes of summarizing this invention, the invention relates to a unique approach for maximizing the number of positive business outcomes on the top of the ranked set by using predictions based on a model. The business outcome is set directly by the user of the system of the present invention by feeding annotated conversations into the system. The annotation consists of sound files labeled as successful/not successful business event. The prediction is based on a model which relies on the extracted features of digitally recorded conversations.

In one aspect of the present disclosure, a method, system, and/or apparatus may include the following steps: initial model, generate rank, validate model, and refine model. Initial model may include providing the method, system, and/or apparatus with a collection of annotated audio recordings, such as telephone conversations. These audio recordings are preferably annotated in accordance with the business result desired (i.e. successful/unsuccessful sales calls).

The generate rank step includes extracting pre-selected features from each recorded conversation and then running the prediction engine. The validate model may include comparing the desired business outcome with the ranked audio conversations. The refine model step learns from the validation phase and may upgrade the initial model or build a new one based upon the desired business results. This validation stage may also include feedback from the customer.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and an understanding of the invention may be had by referring to the summary of the invention and the detailed description of the preferred embodiment in addition to the scope of the invention defined by the claims taken in conjunction with the accompanying drawings.

BRIEF DESCRIPTION OF THE DRAWINGS

For an understanding of the nature and objects of the invention, reference should be had to the following detailed description taken in connection with the accompanying drawings.

DETAILED DESCRIPTION OF THE PREFERRED EMBODIMENT

The present invention relates to a method for analyzing recorded telephone calls in order to predict business outcomes. The method involves recording a series of initial telephone calls and analyzing those calls for particular audio features. The audio features are tabulated and annotated to specify whether the telephone call resulted in a pre-determined business outcome. A model is then built whereby the pre-determined business outcome can be predicted based upon the presence of certain audio features. The model can subsequently be used to predict whether future calls are likely to result in the pre-determined business outcome. The various features of the present invention, and the manner in which they interrelate, are described in greater detail hereinafter.

In one preferred embodiment (the initial model) of the system or method in accordance with the present disclosure, a user may feed the system with annotated conversations (successful/not successful event) and the system builds a model based on this train information. During ranking, the system of the present invention constructs an equal number of features for each conversation and runs the prediction engine. During validation, the system of the present invention reveals the business outcome of the ranked conversations by the underlying business process.

The system of the present invention learns from the validation phase and is capable to either upgrade initial model or build a new model. The speech analytics and data mining software techniques of the present invention are comprised of layered software architecture consisting of a core engine, a scheduler and a graphical user interface.

The core engines of the system consist of all speech analytics and data mining modules necessary for feature extraction, automatic model building and predictions. Core engines are the most essential part of the present invention due to the proprietary, self-researched algorithms in the field of machine learning and parallel processing. Notably, the system does not apply conventional text mining approaches by converting speech to text. Instead, the system extracts features directly from recorded voice. As a result, the system is not language specific and can be used on multiple different languages.

Figure 1:
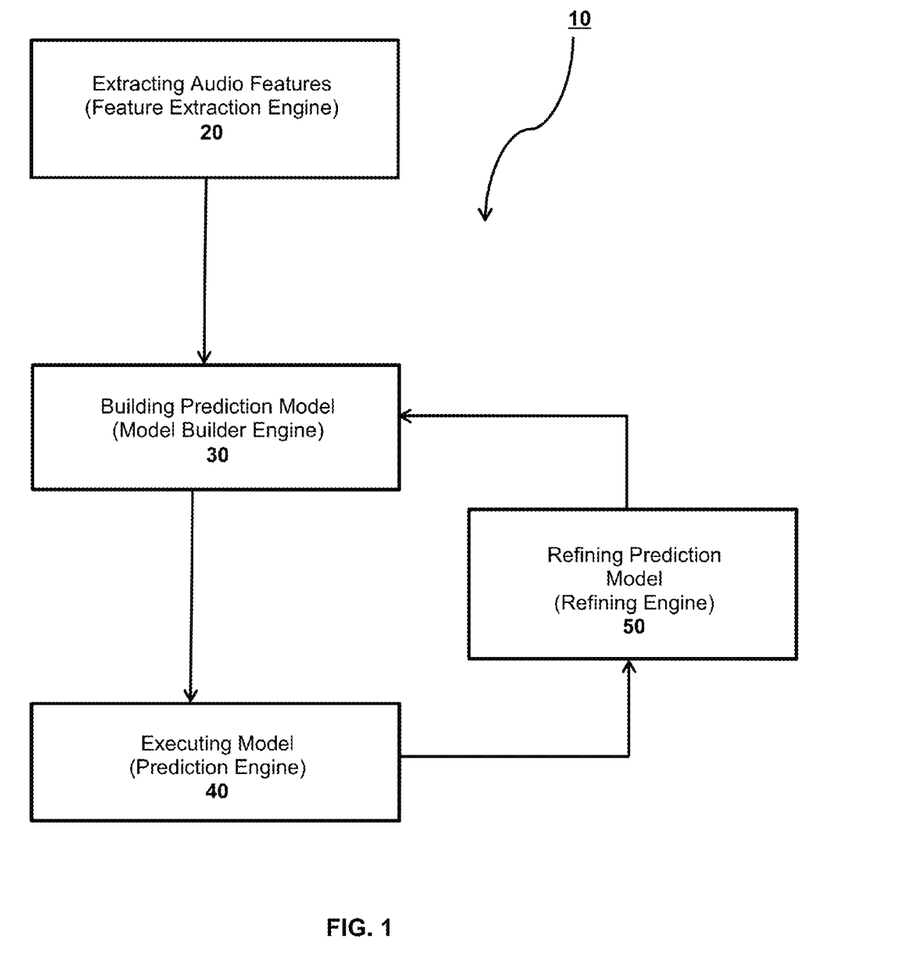
FIG. 1 is a flow chart illustrating the steps associated with the method of the present invention.

As noted in FIG. 1, the system 10 of the present invention has three core engines. These include a feature extraction engine 20, a model builder engine 30, and a prediction engine 40. Furthermore, an additional refining engine 50 can be included for refining the initial model. The function and operation of each of these engines is described next.

Feature Extraction Engine

Figure 2A:
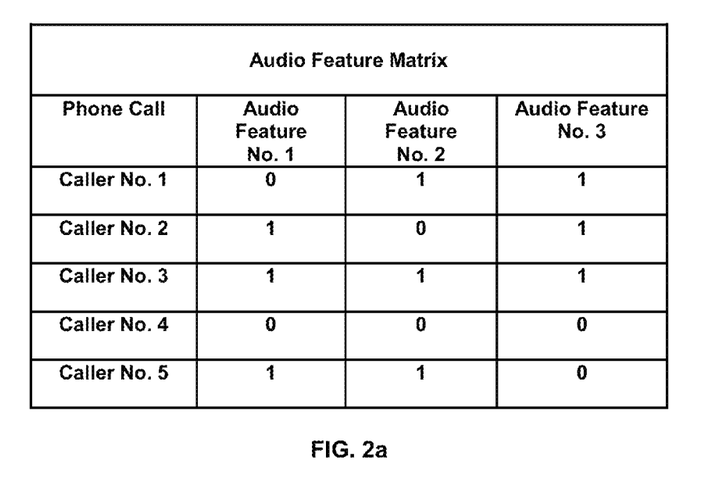
FIG. 2a is a table of extracted audio features.

The feature extraction engine 20 of the present invention is a module that processes the sound files and extracts equal number of features from it. This feature matrix is later used for model building and prediction engines. The extraction engine 20 records a series of telephone calls. These are ideally calls from individuals to a business. The calls are digitally processed as sound files. Thereafter, the sound files are analyzed and various audio features are extracted from each of the telephone calls. The extracted features may be, for example, volume, tone, pitch, speed, etc. Other features can be extracted that are indicative of certain emotions, such as anger, happiness, or frustration. Thereafter, the extraction engine 20 builds a feature matrix whereby a plurality of the extracted audio features are tabulated. An example of such a tabulation is included as FIG. 2a.

Model Builder Ermine

Figure 2B:
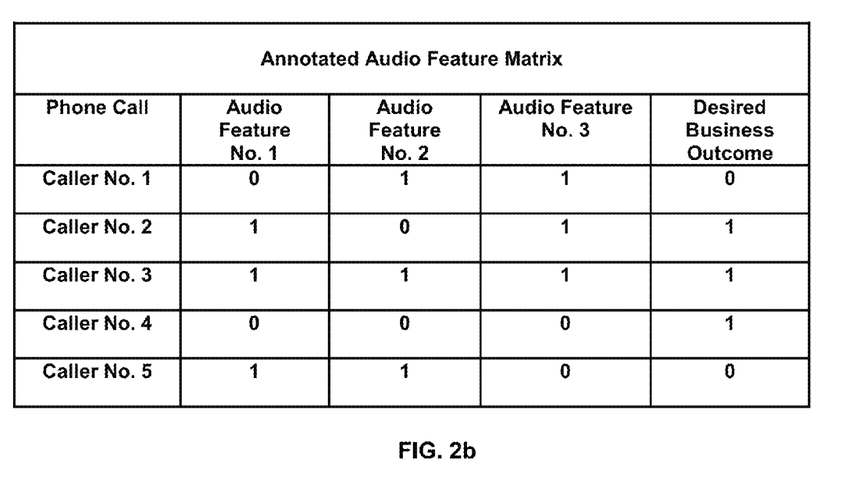
FIG. 2b is a table of extracted audio features tabulated relative to desired business outcomes.

The model builder engine 30 of the invention automatically builds a model based on whether the individual telephone calls resulted in a pre-determined business outcome. Pre-determined business outcome can be any of a wide variety of favorable business outcomes. The pre-determined outcome may be, for example, whether a sale is completed, whether the individual participated in a survey, or whether the individual chose to sign up for a mailing list. Any of a number of other pre-determined business outcomes can likewise be used in connection with the invention. The model builder engine 30 updates the feature matrix by indicating whether the pre-determined business outcome was achieved for a particular call. The annotated feature matrix is indicated in FIG. 2b.

Thereafter, the annotated feature matrix is used to establish a model whereby the pre-determined business outcome is associated with a subset of the extracted audio features. For example, the model may specify that a particular voice tone, inflection, and speed are more frequently associated with the pre-determined business outcome. Likewise, a tone, inflection, or speed above or below a pre-determined threshold value can be associated with a business outcome. The referenced measurements can be made in decibels, voice frequency, or words per minute. The model would, therefore, specify that callers matching those audio features are more likely to result in the favorable business outcome. The engine's output is a model that is used for future predictions. For example, with reference to FIG. 2a, the model may predict a positive outcome when audio features 1 and 2 are present.

Prediction Engine

The prediction engine 40 uses the model and the extracted features to predict the business outcome for new sound files. The prediction engine 40 records additional telephone calls from individuals calling the business. These calls are likewise processed as sound files. Various audio features are again extracted from each of the sound files. Thereafter, the engine 40 predicts whether the pre-determined business outcome will occur based upon the established model. Namely, the established model is compared to the newly extracted voice feature to predict the likelihood of a desired business result. The telephone calls can be placed in a ranked order based upon the prediction. This ranking, in turn, can be used to properly route and/or prioritize calls within the business.

Refining Engine

Following the disposition of the call, the refining engine 50 can be used to further develop the model. This is accomplished by determining whether each additional telephone call, in fact, resulted in the actual occurrence of the pre-determined business outcome. Next, a comparison is made between the actual occurrence with the prediction. In other words, the actual occurrence can be used to either validate or refute the prediction. The model can then be modified as needed based upon the comparison between the actual and predicted outcomes.

Scheduler

The scheduler of the present invention is a component to start, stop and supervise the system's core processes. Additionally, the scheduler features both a single and a multi-threaded mode to maximize performance.

The graphical user interface of the present invention enables end users to build, run and refine models, administer projects and browse the ranking results. The graphical user interface is an intuitive, lightweight and web-browser based software. In addition to the graphical user interface, the system of the present invention is able to run in command line (scripting)/service mode in order to enable system-level integration with different systems.

Optimize for Business Outcome

The present invention may be referred to below as Rank Miner or the present system. One of the unique qualities of the present system is that it is capable of building its model and optimizing it for successful business outcomes. This means the following: based on each conversation the company initiates certain business activities. Each activity may have an associated successful and unsuccessful event (e.g. a successful sale).

We may also associate revenue and cost to each activity (e.g. cost of call, wages, etc.). If the business activity (e.g. sales activity) is successful that means revenue and profit for the company. The costs as well as the revenues may have a different structure, for example a cost may arise after each call or after 10 successful sales as well. If the business activity is not successful, only the associated cost remains. The system can draw a profit curve based on validation results, expected costs and revenues. It is suggested to use ranked list at the maximum level of profit. It is easier to decide the threshold of maximum profit based on the profit curve. Based on historical business activity results, the present system's machine learning method may be able to learn these business results and the ranked list will be optimized directly for business outcome, and the customer can decide which is the optimal percentage of the ranked list to use, which means a unique differentiation from existing prior art.

Another distinguishing feature of the system may be the learning of ranking: current research gives a special solution for an intensely-researched problem of machine learning. In our case, numeric values assigned to (telephone) conversations constitute the input of the learning process. In a binary case, 1/0 values mean whether the business event was successful, that is, for example, the client bought the product/service in question during the second direct call or not.

The present system's unique approach includes maximizing the number of positive business outcomes at the top of the ranked set by using predictions based on a model. The business outcome is set directly by the user of the system by feeding annotated conversations into the system based on the customer's historical business data. The annotation may consist of sound files labeled as successful/not successful business event. The prediction is based on a model which relies on the extracted features of digitally recorded conversations and optimizes directly for the customer's business profit.

Method

Figure 3:
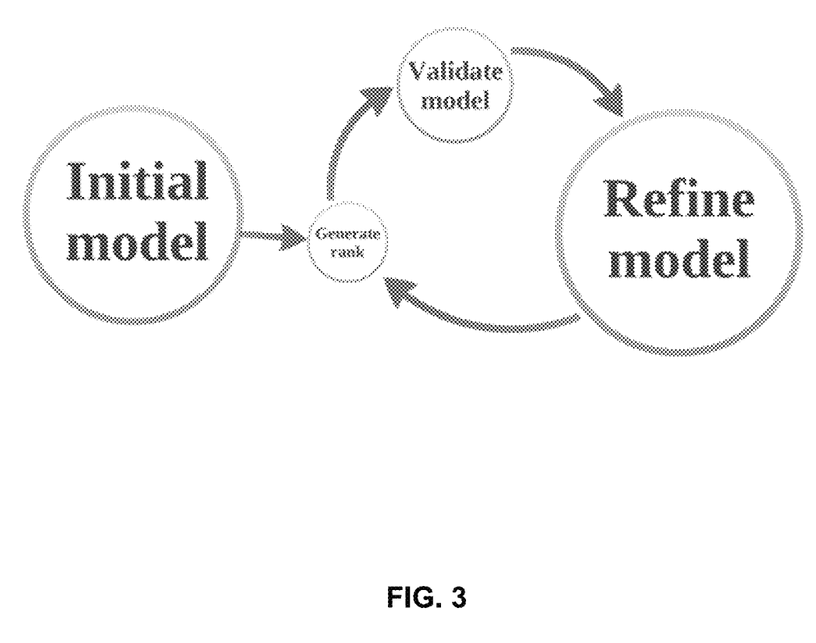
FIG. 3 is a diagram illustrating the initial model, rank generation, model validation and model refinement.

The present method may include four steps as noted in FIG. 3:

Initial Model (Step 1)

Feeding the system with annotated conversations (successful/not successful events). The system builds a model based on this train information.

Generate Rank (Step 2)

During ranking, the system extracts an equal number of features from each conversation and runs the prediction engine. Ranking can be optimized for lift measure.

Validate Model (Step 3)

During validation the business outcome of the ranked conversations is revealed by the underlying business process.

Refine Model (Step 4)

The system learns from the validation phase and is able to either upgrade the initial model or build a new one. The refining process uses the customer's feedback thus providing a dynamic, continuous prediction model optimization.

Figure 4:
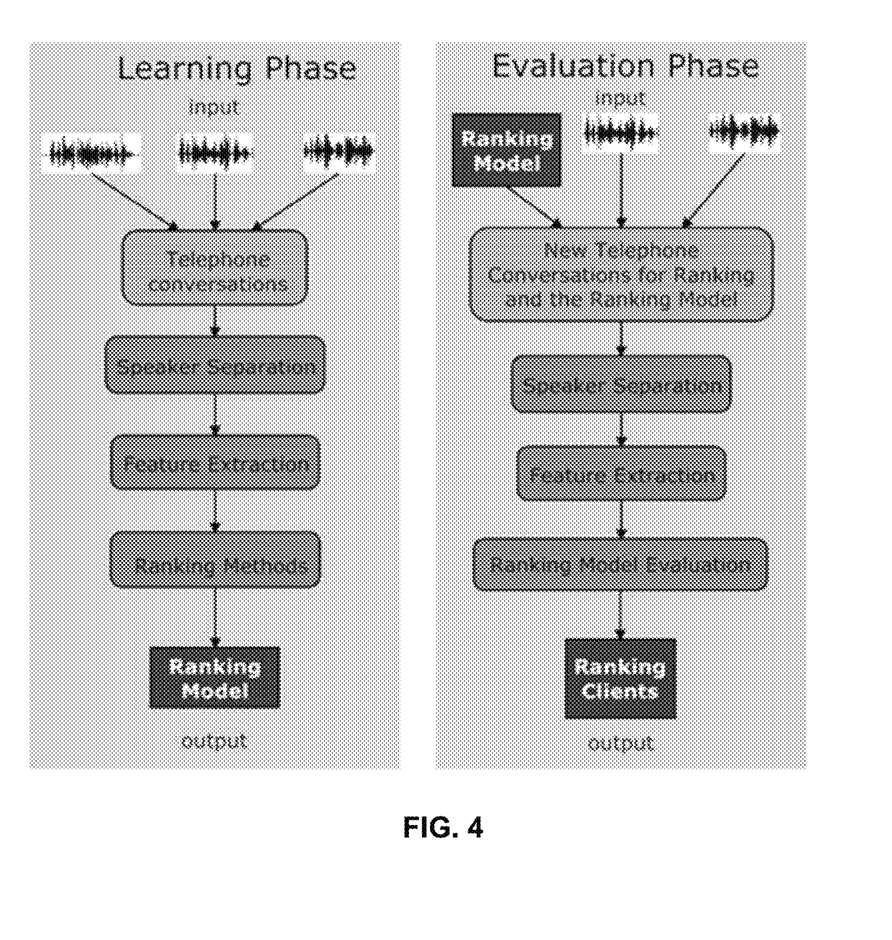
FIG. 4 is a flow chart showing different steps of both the learning and the evaluation phases in parallel.

The phases of the ranking process can be seen in FIG. 4. The discussion below is exemplary only.

On the left side of FIG. 4 we can follow the learning phase, and parallel to it, the evaluation phase can be seen on the right. Agent-client conversations in way file format along telephone sampling (usually 8 khz, 8 bit mono) constitute the input of both phases. Let us note that both phases can be divided into three functional blocks: pre-processing (noise filtering, speaker separation), feature extraction and ranking.

Learning Phase

During the learning phase, telephone conversations and numeric values indicating whether the business event occurred or not (0/1) constitute the input. First, we filter noises from the signal, then we attempt to separate the speech segments of agent and client. We consider certain segments where neither the agent nor the client is speaking as unproductive. The next step is feature extraction, during which we examine the characteristics of the dialogue and emotional features of agent and client. We extract the same number of features from each conversation, and convert them into a vector containing numeric elements. In the learning phase we build a model to find the correlations between these vectors and the assigned success indexes.

Evaluation Phase

As regards its distinct steps, the evaluation phase follows those of the learning phase. Exactly the same steps must be executed on the input data during the use of the ranking model as in the learning phase. The only difference lies in the fact that the success index is not part of the input of the system, since that is exactly what we are going to estimate. We execute the steps we have already taken in the learning phase until the feature extraction phase, and then evaluate the ranking model of the features received. As the output of the evaluation phase we receive a prediction to the incoming conversations concerning their success indexes. On the basis of this, we can rank clients who are yet to be contacted directly.

FIG. 4 shows different steps of both the learning and the evaluation phases parallel to one another from input to output. The learning phase displays the methods of model construction, and the evaluation phase presents the application of the model for the cases of telephone conversations that are unknown to the model.

Further components of the present disclosure are discussed below.

Noise Filtering

Telephone conversations undergo several signal processing steps. First we may normalize the signal with deviation and average, and it is followed by the removal of the noise, for which we apply the method Spectral Mean Subtraction. We may construct the spectrum using slices of 10 ms samples, and a window size of 1024, with the fast Fourier Transformation along with applying Hamming window.

Speaker Separation

Using the spectrum received after noise filtering, we may attempt to separate the different speakers. Its first step may be a dividing process that produces chunks, i.e. 1-3-second pieces of the signal along minimal energy-level cutting points. We identify the pieces with learning algorithm as homogenous human speech, simultaneous speech, music or non-informative parts. For the classification we have chosen KTM kernel-based non-linear learning process. A learning database was constructed during the process, whose aforementioned four classes contained at least 5000 samples respectively. For the representation of samples to be learned we extract power spectral density features and the histogram of mel frequency cepstral coefficients' changes. The accuracy of detection is measured on an independent database, in which we detected a higher than 96% accuracy in the case of each class. As the next step, segments identified in homogenous human speech must be partitioned into two fields, which are agent and client segments. To achieve this, we taught a dissimilarity function relating to segment pairs with the help of machine learning. This function assigns a value near 0 to segment pairs selected from the same speaker, and a value near 1 to segment pairs selected from different speakers. In the learning process of the dissimilarity function we used 10000 segment pairs belonging to the same speaker and 10000 belonging to different speakers. On the basis of the learned dissimilarity function we construct the dissimilarity matrix of homogenous segments for each pair, then with an appropriate hierarchical clustering application (agglomerative nesting, in our case) we divide the segments into two classes (agent/client). Finally, we remove segments containing non-homogenous speech excerpts from the conversation, and contract the parts belonging to the same speaker and correlating in time. After contraction, we obtain an "ABABAB"-type analysis of the conversation, which prepares the field for the execution of further operations.

Feature Extraction

As the next step, we may extract three different types of features. We determine communicational features on the basis of speaker changes and the length of consecutive agent-client segments and their different statistical functions.

We extract emotional information from the segments of both the agent and the client. The statistical functions of the extracted information (e.g. minimum, maximum, median, mean, variance, skewness, etc.) constitute the extracted features.

The emotional transition statistics belong to the third class of extracted features. We examine whether consecutive agent and client tracks separately contained changes in different emotional states. For instance, if the client was angry at one moment, but spoke calmly after the agent segment following the client's angry utterance, that constitutes information for us.

Learning Ranking

During the learning phase, correlations may be found between features extracted from conversations and target values assigned to conversations. In our case, the traditional classification and regression approaches of machine learning are not necessarily sufficient by themselves. Our goal is to make a prediction with the help of which those cases end up at the top of the list that more probably lead to successful purchases after ranking based on the prediction value. Ranking methodology perfectly suits real applications if we only intend to highlight a subset of a large set where cases favorable to us are gathered. We wish to have an overview of the elements of the highlighted subset organized in a list based on relevance, similarly to a browser search.

The following questions arise at some ranking learning problems:

i) how to select the ranking measure relevant to us, ii) considering that the learning of different ranking measures regularly leads to learning processes of great time complexity, how to get an appropriate suboptimal solution quickly.

We have chosen Lift, a measure popular in data mining terminology, as the learning measure. Lift measure is the index of the model's performance, which indicates how great the improvement is compared to an arbitrarily constructed model. $Lift_p$ stands for the value of the first p percent of the list. That way $$Lift_p(f_s) = f_s(P)/f_R(P)$$

where $f_s(N)$ is the accuracy of the new S model in the case of the first p percent of the elements, and $f_R(N)$ provides the percentage of the arbitrary model's performance.

Ranking learning was performed with the following algorithm. Double object (D,T) and p value constituted the learning input. (D,T) indicates the learning database, where D=[v1, ... vn] vectors indicate the m dimensional feature vectors assigned to the conversations, and T=[c1, ..., cn] numbers indicate the assigned success indexes. Furthermore, p parameter stands for the cutting at the calculation of Lift measure. M ranking model, whose $Lift_p$ value is the highest out of the constructed model variations, constitutes the output of the algorithm.

Model variations are going to be constructed with the help of feature space transformational processes and the execution of dimension reduction of various degrees. Feature space transformational processes attempt to further modify features extracted from conversations in order to make the D→T learning process more efficient. Methods follow the underlying principle that it is worth oppressing noise-like features, while truly relevant features are being extracted. These methods have two basic types: supervised and non-supervised processes. During the establishment of feature space transformation, supervised processes use T target values along with D samples, whereas non-supervised methods focus only on D feature space. Out of non-supervised methods, we applied the method of principal component analysis, and, out of supervised methods, we tried Spring-Based Discriminating Analysis defined by us, which is similar to Linear Discriminating Analysis. The two applied processes have versions applying non-linear kernel functions (Kernel PCA, Kernel SDA), which we also incorporated into our research [ ]. After this, if we indicate feature space transformation with T, then by that we mean the execution of one of algorithms PCA, SDA, KPCA, KSDA in practice. Samples learning with T transformation are indicated by (TD,T). After feature space transformation, D=[v1, ... , vn] vectors will become the shape of tD=[Tv1, ... , Tvn], where the components of vector Tvi are ordered in the way that dimensions of smaller indexes represent a more relevant feature space component (in the case of spectral feature extraction processes, the dimensions of the new transformed feature space are ordered along the dominant eigenvectors of respective algorithm-specific matrices) [ ]. That is why we can apply a dimension reduction step as well by keeping the first few dimensions of the m dimension space received after transformation. If we keep the first t elements of the Tvi vectors, we indicate the transformation with T_tv_i, and the whole database with (T_tD,T).

The applied ranking algorithm follows the transformation of the feature space with a chosen feature space transformation process, and then we consecutively execute the (T_1D, T), ... , (T_1D,T) dimension reduction steps. We consistently apply the aforementioned KTM non-linear regression process to the learning tasks received that way. Finally, we select the best model on the basis of $Lift_p$ measure. The pseudo-code of the algorithm can be found in the chart Algorithm 1.

The system is applicable for the previously discussed Profit optimization, in which case we use Profitn instead of Liftn, and the value of Profitn is a numeric value derived from income and cost input data. A further distinguishing feature of the present system is profit optimization.

---

Input:
(D,T) -training data
D = [v1,...,vn] - m-dimensional feature vectors
T =[c1,...,cn] - corresponding target values
p - Lift measure parameter
Output:
M - ranking model optimizing $Lift_N$
Algorithm:
T = the feature space transformation provided by PCA, SDA, KPCA or KSDA applied on the training data (D,T)
For I = 1 to m do
   M_I = learn the KTM model on training data (T_ID,T)
      // T_I represents an i-dimensional cut
      // after transformation T
End;
M = Argmax $Lift_p$(M_I)

Voice Analytics, Data Mining Software Techniques

The system is layered software architecture may be made up of a core engine, a scheduler and a GUI.

Core Engines

Core engines consist of all speech analytics and data mining modules that are needed for feature extraction, building an automatic model and making predictions. Core engines are the most essential part of the system due to the proprietary, self-researched algorithms in the field of machine learning and parallel processing. The system has three core engines, a feature extraction, a model builder and a prediction engine.

Feature Extraction Engine

Feature extraction module processes the sound files and extracts an equal number of features from all conversations. This feature matrix is later used for model builder and prediction engines. The features extracted may include:
- speaker separation
- human speech segmentation
- extraction of communication and intonation features
- construction of an equal number of features for each conversation
- working on narrow-bandwidth cell phone/landline quality Model Builder Engine Model builder engine builds a model automatically based on the feature matrix. The engine's output is a model that is used for predictions.

Prediction Engine

Prediction engine uses the previously built business-tailored model to predict the business outcome of the business activity. Using the prediction, the system provides a business-optimized ranked set. The system's uniqueness lies in providing support for the customer's own business activity based on the customer's own historical data by predicting future outcomes.

Scheduler

Scheduler is a system component to start, stop and supervise the core processes of the system. Scheduler features single and multi-threaded modes to maximize performance.

GUI

The system's graphical user interface enables end users to build, run and refine models, administer projects and browse the ranking results. GUI is an intuitive, lightweight, web-browser-based software. In addition to GUI, the system is able to run in command line (scripting)/service mode in order to enable system-level integration with different systems.

Measure Results

We conducted the tests at the customer service center of a company trading holiday rights. Employees of the customer service had to call and invite potential clients to a personal meeting. Clients who did not refuse the offer completely were recalled after a while. We consider the call successful, if the client accepted the invitation, and unsuccessful, if he or she did not. With the help of the ranking system, we endeavored to rank the clients after the first conversation on the basis of success probability, which would potentially result in a higher number of clients after the second call. The learning of the system was conducted on a database of more than 8000 labeled samples with 408 positive cases. During testing, the sample database was divided, and 60% of the samples formed the teaching, and 40% the testing domain. This way, we measured the ranking of a list containing 3200 conversations, out of which 167 were known to be positive outputs. We found the following results:

TABLE 1

Ranking Results

| Percentage of calls | Unranked list: # of attendees | Ranked list: # of attendees | Lift measure (efficiency multiplicator) |
|---|---|---|---|
| 1% | 1.67 | 11.67 | 7.01 |
| 2% | 3.33 | 15.57 | 4.67 |
| 5% | 8.33 | 54.5 | 6.54 |
| 10% | 16.67 | 70.83 | 4.25 |
| 25% | 41.67 | 82.92 | 1.99 |
| 50% | 83.33 | 142.5 | 1.71 |
| 75% | 125 | 155 | 1.24 |
| 90% | 150 | 159 | 1.06 |
| 100% | 166.67 | 166.67 | (—) |

More than 7 times more positive outputs reached the upper 1% of the ranked list as opposed to choice selection, but even on the 10% level, there are more than 4 times more. In other words, calling 50% of the numbers formerly made it possible to reach 50% of the participants (that is 83 clients), with the help of ranking, it is 85% (143 clients), which represents a 72% improvement. With 75% of the calls, 75% (125 clients) of the clients were formerly successfully invited, and with ranking, it is 93% (155 clients) of all the participants, which represents a 24% improvement. All in all, we can assume that calls made in accordance with the ranked list result in considerable additional profit.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method for predicting business outcomes based upon recorded telephone calls, the method comprising:

using a feature extraction engine for using a series of recorded telephone calls of individuals calling a business, processing the recorded telephone calls as sound files, extracting various audio features from each of the telephone calls, and building a feature matrix whereby a plurality of extracted audio features are tabulated, wherein each audio feature is a first dimension in the feature matrix and each telephone call is a second dimension in the feature matrix, wherein the first dimension being one of a row or a column and the second dimension being the other one of the row or the column, wherein extracting various audio features comprises extracting emotional information comprising changes in emotional states;

using a model builder engine for determining whether the telephone calls resulted in a pre-determined business outcome, annotating the feature matrix by indicating whether the pre-determined business outcome was achieved by adding to the first dimension of the feature matrix a business outcome, and establishing a model whereby the pre-determined business outcome is associated with a subset of the extracted audio features;

using a prediction engine for using additional telephone calls from individuals calling the business, processing the additional telephone calls as sound files, extracting various audio features from each of the sound files, predicting whether the pre-determined business outcome will occur based upon the established model, and ranking the additional telephone calls based upon the prediction;

using a refining engine for determining whether each additional telephone call resulted in the actual occurrence of the pre-determined business outcome, comparing the actual occurrence with the prediction and modifying the established model on the basis of the comparison; and
using a Lift measure, $Lift_p(f_s)$, as an index of performance of the model wherein $$Lift_p(f_s)=f_s(p)/f_r(p)$$

where $f_s(p)$ is an accuracy of the a new model, S, in the case of a first p percent of elements and $f_r(p)$ provides a percentage of the model's performance.

2. The method as described in claim 1 wherein the extracted audio features are in the English language.

3. The method as described in claim 1 wherein the extracted audio feature is in a language other than English.

4. The method of claim 1, wherein extracting various audio features further comprises extracting features based on emotional changes in speakers and consecutive agent-client segments.

5. The method of claim 1, wherein extracting various audio features further comprises extracting features comprising speaker separation, human speech segmentation and communication and intonation features.

6. A method for predicting business outcomes comprising:
using a feature extraction engine for using a series of recorded telephone calls, processing the recorded telephone calls as sound files, and extracting various audio features from each of the telephone calls, wherein extracting various audio features comprises extracting emotional information comprising changes in emotional states;
using a model builder engine for determining whether the telephone calls resulted in a pre-determined business outcome, and establishing a model whereby the pre-determined business outcome is associated with a subset of the extracted audio features;
using a prediction engine for using additional telephone calls, processing the additional telephone calls as sound files, and extracting various audio features from each of the sound files, and predicting whether the pre-determined business outcome will occur based upon the established model; and
using a Lift measure, $Lift_p(f_s)$, as an index of performance of the model, wherein $$Lift_p(f_s)=f_s(p)/f_r(p)$$

where $f_s(p)$ is an accuracy of the a new model, S, in the case of a first p percent of elements and $f_r(p)$ provides a percentage of the model's performance.

7. The method as described in claim 6, further comprising ranking the additional telephone calls based upon the prediction.

8. The method as described in claim 7 wherein the rankings determine how the additional telephone calls are handled.

9. The method as described in claim 6, further comprising using a refining engine for determining whether each additional telephone call resulted in the actual occurrence of the pre-determined business outcome, comparing the actual occurrence with the prediction and modifying the established model on the basis of the comparison.

10. The method as described in claim 6, further comprising:
building a feature matrix whereby a plurality of extracted audio features are tabulated, wherein each audio feature is a first dimension in the feature matrix and each telephone call is a second dimension in the feature matrix, wherein the first dimension being one of a row or a column and the second dimension being the other one of the row or the column; and
annotating the feature matrix by indicating whether the pre-determined business outcome was achieved for a particular telephone call by adding to the first dimension of the feature matrix a business outcome.

11. The method as described in claim 6 wherein the audio features further comprises voice volume, tone, emotion, and inflection.

12. The method as described in claim 6 wherein the pre-determined business outcome is whether or not a sale was completed as a result of the telephone call.

13. The method of claim 6, wherein extracting various audio features further comprises extracting features based on emotional changes in speakers and consecutive agent-client segments.

14. The method of claim 6, wherein extracting various audio features further comprises extracting features comprising speaker separation, human speech segmentation and communication and intonation features.

15. A method for predicting business outcomes comprising
using a feature extraction engine for processing a series of telephone calls, and extracting various audio features from each of the telephone calls, wherein extracting various audio features comprises extracting emotional information comprising changes in emotional states;
using a model builder engine for determining whether the telephone calls resulted in a favorable business outcome, and establishing a model whereby the favorable business outcome is associated with the extracted audio features;
using a prediction engine for processing an additional telephone call, extracting various audio features from the additional telephone call, and predicting whether the favorable business outcome will occur based upon the established model; and
using a Lift measure, $Lift_p(f_s)$, as an index of performance of the model, wherein $$Lift_p(f_s)=f_s(p)/f_r(p)$$

where $f_s(p)$ is an accuracy of the a new model, S, in the case of a first p percent of elements and $f_r(p)$ provides a percentage of the model's performance.

16. The method of claim 15, wherein extracting various audio features further comprises extracting features based on emotional changes in speakers and consecutive agent-client segments.

17. The method of claim 15, wherein extracting various audio features further comprises extracting features comprising speaker separation, human speech segmentation and communication and intonation features.

* * * * *